(12) United States Patent
Burkhart et al.

(10) Patent No.: US 10,374,449 B2
(45) Date of Patent: *Aug. 6, 2019

(54) SMART CHARGING PORTABLE ELECTRONIC DEVICE

(71) Applicant: Societe BIC, Clichy (FR)

(72) Inventors: Steve Burkhart, Woodbridge, CT (US); Gerard F. McLean, West Vancouver (CA); Jean-Louis Iaconis, Burnaby (CA)

(73) Assignee: Societe BIC, Clichy (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/730,238

(22) Filed: Oct. 11, 2017

(65) Prior Publication Data
US 2018/0034308 A1    Feb. 1, 2018

Related U.S. Application Data

(63) Continuation-in-part of application No. 14/295,789, filed on Jun. 4, 2014, now Pat. No. 9,800,075.

(51) Int. Cl.
*H02J 7/04* (2006.01)
*H02J 7/00* (2006.01)
*F23Q 3/00* (2006.01)
*H02J 7/34* (2006.01)
*H02J 7/02* (2016.01)

(52) U.S. Cl.
CPC ............. *H02J 7/042* (2013.01); *F23Q 3/00* (2013.01); *H02J 7/0054* (2013.01); *H02J 7/0055* (2013.01); *H02J 7/0047* (2013.01); *H02J 7/022* (2013.01); *H02J 7/345* (2013.01); *H02J 2007/005* (2013.01); *H02J 2007/0062* (2013.01); *Y10T 307/406* (2015.04)

(58) Field of Classification Search
CPC ................................................. H02J 7/042
USPC ........................................................ 307/31
See application file for complete search history.

(56) References Cited

U.S. PATENT DOCUMENTS

2010/0134305 A1*  6/2010  Lu .................... H02J 7/0021
                                                 340/636.13

* cited by examiner

*Primary Examiner* — Joseph Chang
(74) *Attorney, Agent, or Firm* — The H.T. Than Law Group (57) ABSTRACT

A smart electronic system is disclosed. The system can analyze any input voltage to determine whether the input voltage is sufficient to charge the battery of an electronic device and/or to operate the electronic device. If not, the cable is capable of transforming the input voltage to a voltage sufficient to charge and/or operate. The electronic device may be incorporated into the housing of the smart electronic system, and can be any known mobile devices.

20 Claims, 9 Drawing Sheets

SMART CHARGING PORTABLE ELECTRONIC DEVICE

FIELD OF THE INVENTION

The invention pertains broadly to a method and apparatus for powering and/or charging a portable electronic device that employs a smart voltage transformation cable or system to connect the portable electronic device to any electrical power source to charge or power the portable electronic device. The smart voltage transformation cable or system includes circuitry for analyzing the voltage from the electrical power source and determining whether the voltage can directly power and/or charge the portable electronic device or whether the voltage should be transformed before powering and/or charging. The present invention is also related to a portable smart electronic device.

BACKGROUND OF THE INVENTION

In recent years, the use of Universal Serial Bus (USB) technologies has blossomed in many different portable electronic consumer devices such as laptops, tablets, iPod® devices, cell phones, smart phones, smart watches, handheld game consoles, portable media players, digital cameras and DVD players, and other portable or mobile devices including flameless lighters. These devices require electricity to power them and, typically, these devices are provided with an internal rechargeable battery that provides the required operative voltage and current. USB cables can be used to facilitate charging the battery within the portable consumer electronic devices from external power sources, as well as to transport data between devices.

Devices for recharging the internal rechargeable batteries of such portable electronic consumer devices include wall chargers, disposable or rechargeable battery chargers, power banks, fuel cell chargers, wind powered chargers and solar powered chargers. However, each of these battery recharging systems includes multiple components and have certain drawbacks.

For instance, a wall charger typically includes a plug for a wall socket, an AC-DC converter, and a cable with a USB plug for plugging into the USB port of the target mobile device that requires recharging. Thus, the wall charger converts AC voltage from a wall socket to DC voltage that is suitable for powering a mobile device and/or recharging the mobile device. The main draw backs with a wall charger are that one must have access to an AC wall socket to recharge and that during the recharge the consumer electronic device is tethered to the wall losing its mobility.

Recharging systems that have greater plug independence include disposable or rechargeable battery charging systems, power bank charging systems and fuel cell charging systems. Such charging systems may be characterized as "depleting power sources" because they typically are provided with a maximum fuel amount or electrical energy charge that is transferred to the batteries being recharged. Batteries in a battery charging system may not hold sufficient power to fully charge a smart phone or a computer tablet, and have relatively short shelf lives. Power bank modules need to be recharged before they can recharge mobile devices. A fuel cell charging system may recharge mobile electronic devices with a USB cable; however, fuel cell systems require fuels such as hydrogen or methanol to convert to electricity. Fuel cell systems are improvements over chargers that require fresh batteries and chargers that should be charged themselves before being useable, because fuel cells are reusable and only need fresh fuels. Examples of fuel cell chargers include but are not limited to U.S. Pat. Nos. 7,642,742, 9,023,545 and 9,276,271, and U.S. published patent application Nos. US 2014/0272647, which are incorporated herein by reference in their entireties.

However, there is a need for a "smart" or "universal" USB charging system that can reside within an electronic device that can analyze the voltage of various voltage sources, such as wall chargers, battery chargers, power bank chargers, and fuel cell chargers, including the electronic device's own internal power source or battery, and that can determine which type of voltage source is supplying the recharging voltage, and then transforming the recharging voltage, as required, to meet the operative energy needs of electronic devices.

BRIEF SUMMARY OF THE INVENTION

The invention pertains to a smart charging or operating system and a method of operating the system. The system can analyze any input or internal voltage to determine whether the input or internal voltage is sufficient to charge its battery or to power the electronic device associated with the smart charging system. If not, the system is capable of transforming the input or internal voltage to a voltage sufficient to operate the system or to charge its battery.

The present invention is also related to a method of providing power to an electronic device. This power may be used to operate or run the electronic device or to charge the internal battery in the device or both.

An embodiment of the present invention relates to an electronic system comprising an analyzing assembly electrically connected to an energy storage device disposed within a housing of the electronic system. The analyzing assembly includes a voltage analyzing circuit to analyze a first voltage supplied by the energy storage device, at least one electrical converter to transform the first voltage to a second voltage sufficient to charge a battery of an electronic device or to power the electronic device, a bypass circuit, and an under voltage lock out device. When the first voltage is sufficient to charge the battery or to power the electronic device the first voltage is directed to the bypass circuit to charge the battery or to power the electronic device. When the first voltage is not sufficient to charge the battery or to power the electronic device the first voltage is transformed to the second voltage by the at least one electrical converter to charge the battery or to power the electronic device. The under voltage lock out device shuts down the electronic device when the first voltage falls below operating voltage of the electronic device, or shuts down the electronic system when the first voltage falls below a predetermined level.

Another embodiment of the present invention relates to an electronic device comprising an analyzing assembly electrically connected to an energy storage device. The analyzing assembly includes a voltage analyzing circuit to analyze a first voltage supplied by the energy storage device, at least one electrical converter to transform the first voltage to a second voltage sufficient to power the electronic device, a bypass circuit, and an under voltage lock out device. When the first voltage is sufficient to power the electronic device the first voltage is directed to the bypass circuit to power the electronic device. When the first voltage is not sufficient to power the electronic device the first voltage is transformed to the second voltage by the at least one electrical converter to power the electronic device. The under voltage lock out device shuts down the electronic device when the first voltage falls below operating voltage of the electronic device, or shuts down the electronic device when the first voltage falls below a predetermined level.

The at least one electrical converter can be a DC/DC converter, which may be a step-up converter or a step-down converter, or an AC/DC converter. The electronic system may comprise a state of charge indicator, and an operating switch connected to the state of charge indicator. The energy storage device can be another battery or a capacitor. The electronic device may be contained in the housing of the electronic system and the electronic device can be a lighter, which may be an arc lighter or may have a heating element.

BRIEF DESCRIPTION OF DRAWINGS

The foregoing and other features and advantages of the invention will be apparent from the following description of the invention as illustrated in the accompanying drawings. The accompanying drawings, which are incorporated herein and form a part of the specification, further explain the principles of the invention and to enable a person skilled in the pertinent art to make and use the invention.

DETAILED DESCRIPTION OF THE INVENTION

The present invention is directed to a method and device for powering a consumer electronic device and/or charging the internal battery associated with a consumer electronic device. The present invention includes, but is not limited to, using a smart device or a smart cable to transform the voltage and/or current from practically any charging power sources including depleting power sources to a voltage and/or current to charge the battery associated with consumer electronic devices or to power the consumer electronic devices. The charging power sources can be disposable or rechargeable battery chargers, power pack chargers, fuel cell systems, solar panels, manual-crank chargers. The inventive smart device or cable can determine the nature of the voltage and current of the charging power sources and intelligently decides whether the charging power source meets the operative requirements. If the charging voltage and current are within the operative range, then charging can proceed. If the charging voltage and current are not, then the smart cable decides the reasons why the voltage and current are not within the operative range and then transform the non-operative voltage and current to the operative range for charging.

Regardless of the input electrical power, the output power is in the range that is compatible or acceptable to the electronic device. The output power can be used to operate or run the electronic device or to charge/re-charge its internal battery, or both. While the descriptions herein discuss charging the electronic device's internal battery, it is understood that the output power from the inventive smart cable can be used to operate or run the electronic device and the charging power source can be the electronic device's own internal battery being transformed to operate the electronic device.

Suitable electronic devices include, but are not limited to, laptops, computer tablets, iPod® devices, cell phones, smart phones, smart watches, handheld game consoles, portable media players, digital cameras, DVD players, camping equipment, such as lanterns, cook tops, ignition devices, lighters, etc. and other mobile or portable devices.

In one example, both the battery to be charged and the charging power source are DC, but the voltage of the charging power source can be too high or too low, e.g., low voltage of a depleting battery. The smart system or cable can transform the high voltage to the operative voltage. This transformation can increase the current, which may improve the efficiency of the recharging. Without being bound to any particular theory, the present inventors believe that during a recharge the electrical power (P) losses in the cable are related to $I^2R$, where I is the current and R is the resistance. Hence, transferring power P at higher voltage V allows for a lower current I, which can reduce power losses. It is advantageous to locate the stepping-down DC/DC converter closer to the output end of the cable, so that lower power losses at higher voltage and lower current can occur in a longer length of the cable from the input end to the DC/DC converter, and higher power losses are limited to a relatively shorter length of cable from the DC/DC converter to the output end. Since power losses are related to the square of the current I, the location of the DC/DC stepping down converter along the cable closer to the output end can increase the charging efficiency or the power transfer efficiency. The smart system or cable can also transform the low voltage of a depleting battery using a DC/DC converter to a higher voltage preferably within the operative range to charge. While this transformation may decrease the current, but advantageously it utilizes the residual power in depleting power sources that otherwise would not be used. In another example, the battery to be charged requires DC voltage/current and the voltage and current of the charging power source is AC current. The smart cable would detect such AC current and then transform the charging voltage and current to DC. The inventive smart system or cable would then ascertain whether the transformed DC power is operative or not and take appropriate actions, discussed above.

In accordance with current mobile device technology, an operative voltage for charging a rechargeable battery of a portable electronic device is 5V±0.25 V supplied with a supply current of up to 500-1500 mA at this voltage, and a power of 2.5 Watts to 7.5 Watts. See, e.g., USB-IF, Battery Charging Specification, Revision 1.2, Oct. 12, 2011. It is noted that USB charging can occur and have occurred at current lower than 500 mA and at power less than 2.5 Watts. However, should the standards for operative voltage change in the future, the scope of the present invention should be construed to encompass it. In other words, the operative voltage of the present invention is not limited to the 5V employed by current standards pertaining to charging voltages for mobile devices. On the contrary, operative voltage pertains to the voltage required to effectively recharge a rechargeable battery of a mobile device regardless of any current or future changes in industry standards.

Figure 1:
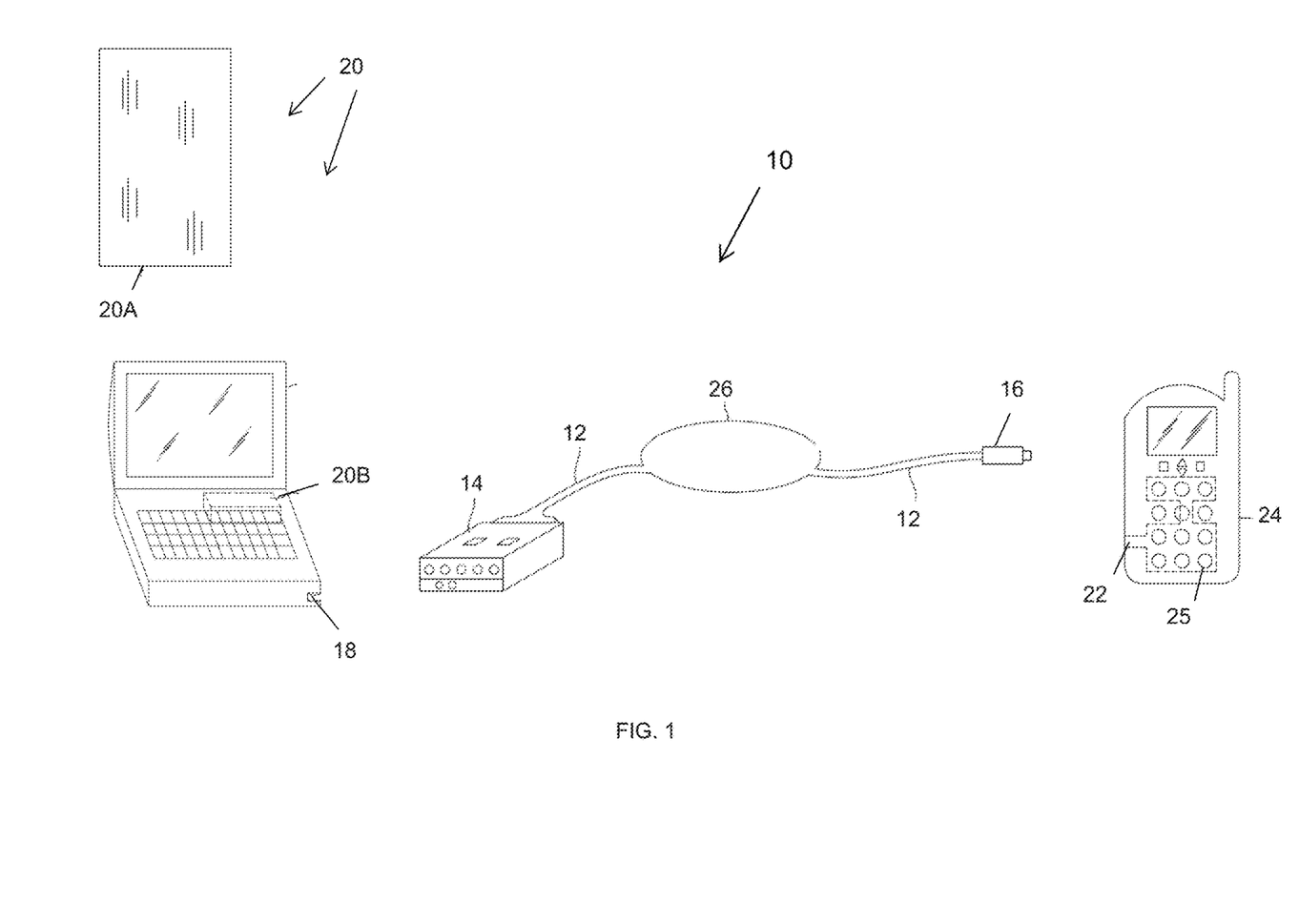
FIG. 1 illustrates an embodiment of a smart voltage transformation system or cable of the present invention.

In accordance with one embodiment of the present invention, as shown in FIG. 1 a smart voltage transformation system or cable 10, which may be constructed as a cable with USB-type or other standardized or non-standardized ends, is provided and includes a flexible cable 12 provided with a standard type A male connector 14 on one end thereof (also referred to as the input end), and a standard type B male connector 16 on the other end thereof (also referred to as the output end). The standard type A male connector 14 is configured to matingly connect with a corresponding female connector 18 of an electrical charging power source or supply 20, and standard type B male connector 16 is configured to matingly connect with a corresponding female connector 22 of a portable electronic device 24, such as a laptop, a tablet, an Ipod, a cell phone, a smart phone, a smart watch, a handheld game console, a portable media player, a digital camera, a DVD player, camping equipment such as cook tops, igniters and lighters, and like devices, which all may be characterized herein as "mobile devices" or "electronic devices" in accordance with the present disclosure. Thus, when standard type A male connector 14 is connected to female connector 18 of electrical power source 20, and standard type B male connector 16 is connected to female connector 22 of mobile device 24, then charging power source 20 is electrically connected to supply electrical energy to the mobile device to be able to recharge the rechargeable battery 25 of mobile device 24, or to directly power the mobile device 24. In accordance with the present disclosure, a "standard type A male connector" and a "standard type B male connector" include macro, mini and micro connectors. Furthermore, in accordance with the present invention, connectors 14 and 16 may also be other standard or non-standard connectors.

Charging power sources 20 can be battery chargers (disposable or rechargeable batteries), a power bank or pack, fuel cell chargers, solar chargers and hand-crank chargers, etc., illustrated by reference number 20A in FIG. 1. Charging power sources 20 can also be the internal battery 20B of another electronic device, such as laptops, computer tablets and desktops, which can be an AC or DC power source.

Smart system or cable 10 is provided with a charging or analyzing assembly 26 disposed between connectors 14 and 16, and that is electrically connected to connectors 14 and 16 via cable 12. The smart charging assembly 26 is provided with circuitry 28 and a processor 30 for determining whether the voltage generated by the power source 20 is an operative voltage, or a non-operative voltage.

Figure 2:
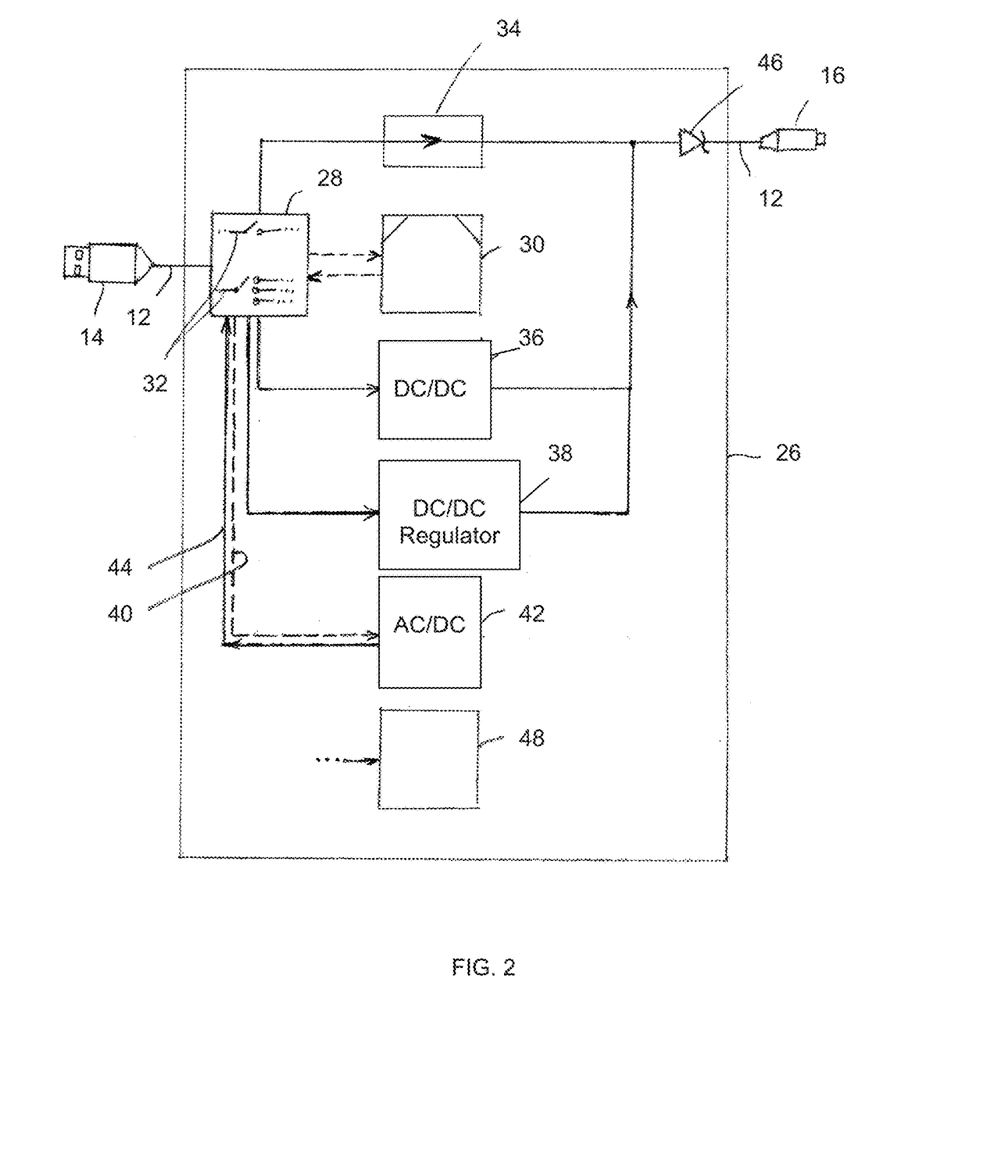
FIG. 2 is a schematic drawing of a charging or analyzing assembly of the inventive smart system or cable of the present invention.

Referring to FIG. 2, charging assembly 26 comprises analyzing circuit 28 connected to processor or micro-processor 30. Although circuit 28 and processor 30 are illustrated as two separate components, they can be combined into a single component. Voltage analyzing circuit 28 receives voltage $V_{20}$ of the power supply 20. Processor 30 instructs analyzing circuit 28 to determine the characteristics of voltage $V_{20}$, i.e., whether the voltage is AC or DC, its amplitude, current and if applicable frequency. Circuit 28 may contain digital circuit and sensors, such as voltmeter(s) and amp meter(s) that can produce digital signals readable by processor 30. If voltage $V_{20}$ is operative to charge electronic device 24, e.g., 5V±0.25 V, 500-1500 mA and 2.5-7.5 Watts USB standard or at lower current and power discussed above, processor 30 moves switch 32 to connect $V_{20}$ to bypass 34 which directly connects $V_{20}$ to outlet connector 16 to charge device 24. In this configuration, system or cable 10 operates similar to a conventional USB charging cable. Although not specifically disclosed, smart system or cable 10 may also carry wires that in addition to transporting electrical power to charge may transmit signal, information or data similar to a USB cable.

If $V_{20}$ is not operative to charge device 24, then processor 30 may instruct circuit 28 to determine whether $V_{20}$ is DC or AC. If $V_{20}$ is DC but its voltage is below the operative voltage, processor 30 may instruct switch 32 to connect $V_{20}$ to first DC/DC converter 36. DC/DC converter 36 is a step-up converter capable of increasing the voltage of $V_{20}$. DC/DC converters are electronic components or circuits that convert a DC current from one voltage to another voltage. Suitable DC/DC converters can be any type of converters including but not limited to linear regulators, electronic switch-mode converters, magnetic converters. Converter 36 preferably increases $V_{20}$ to an operative level that can charge device 24.

An advantage of using step-up DC/DC converters is that power source 20 can be depleting batteries. Power sources 20 may also include standard batteries and batteries that are manufactured with voltages that are out of desired voltages even before the first use and other non-standard batteries, e.g., not conforming to AA, AAA, C, D or rectangular 9V standards or the like. Non-conforming or non-standard batteries can be manufactured at lower costs. As batteries deplete, their voltages drop. When the voltages drop below the level that batteries 25 to be charged can accept, the depleting batteries can no longer be used even though they still contain power albeit at lower voltages. The depleting batteries are then discarded if they are disposable or potentially recharged if they are rechargeable. Smart system or cable 10 of the present invention can harvest the remaining or residual powers in the depleting disposable batteries prior to their disposal. Smart system or cable 10 maximizes the power output of batteries by minimizing the residual power that is typically discarded. In one example, laptop internal battery 20B may be depleted to a point where it may not be able to power the laptop computer but may contain sufficient residual power to at least partially charge a mobile or smart phone sufficient to place a phone call or to read e-mails/texts.

If $V_{20}$ is DC but its voltage is above the operative voltage, processor 30 may instruct switch 32 to connect $V_{20}$ to second DC/DC converter 38, which is a step-down converter. Converter 38 reduces the voltage of $V_{20}$ preferably to a level that can recharge device 24. Preferably, step-down converter 38 is known to those skilled in the art as a step-down buck converter, which in addition to reducing the voltage also increases the current. Buck converters are generally more efficient DC/DC switch converters than linear converters, which dissipate the power from the stepped down voltage as heat. Alternatively, the stepping-up and stepping-down functions can be performed by a single DC/DC converter. Single DC/DC converters that can perform the stepping-up (or boost) and stepping-down (buck) functions are commercially available and in certain embodiments are preferred.

Preferably the DC/DC converters may have either constant current output or constant voltage output depending on the charging state of the electronic device. Controller 30 may sense the charging requirement of the electronic device, and select the proper DC/DC converter. Constant current or constant voltage converters are commercially available from Linear Technology in Milpitas, Calif. and PowerStream Technology in Orem, Utah.

If $V_{20}$ is AC, then controller 30 and/or circuit 28 sends the AC $V_{20}$ along line 40 (shown as a broken line in FIG. 2) to AC/DC converter 42. AC/DC converter 42 transforms the AC current to DC and resends the transformed DC current along line 44 back to circuit 28. Circuit 28 then repeats the inquiry of whether the DC current $V_{20}$ has the operative voltage to go to bypass 34 or to DC/DC converter 36 or DC/DC converter 38, as discussed above.

Optionally, smart system or cable 10 may also include a DC/AC converter that can output AC current. Moreover, if the output requirement is AC and the input is AC, then the input AC currently may pass through the smart system 10, as discussed above.

Optionally, a rectifier 46, such as a diode, is positioned between outlet connector 16 and the other components in charging assembly 26 to prevent or minimize current from reversing direction and leaving device 24 to go into smart system or cable 10 or back to charging power source 20, for example when power source 20 is a depleting power source. Charging assembly 26 may also include other functional components, illustrated as element 48. The other functional components can be a diode to show that cable 10 is ON and functioning, or a display to show texts indicating that the system or cable 10 is charging or when charging is complete. The display can also convey an error message showing various reasons why charging cannot proceed or be completed. The display can also show a state of charge of power source 20 or battery 25 within device to be charged 24, or remaining charging time. Element 48 can also be low or under voltage lock out (UVLO), which may shut down electronic device 24 during recharging when $V_{20}$ falls below the operating voltage of electronic device 24. The UVLO preferably shuts down charging assembly 26 when $V_{20}$ falls below a predetermined level. Element 48 can also be an energy storage device, such as a battery, a depleting battery or a capacitor, that stores energy optionally from a previous charge. In one embodiment, energy storage device 48 can charge battery 25 in electronic device 24 without power source 20. Power from storage device would be directed to analyzing circuit 28 and/or processor 30 to be analyzed and converted, if necessary, to charge battery 25.

Figure 3:
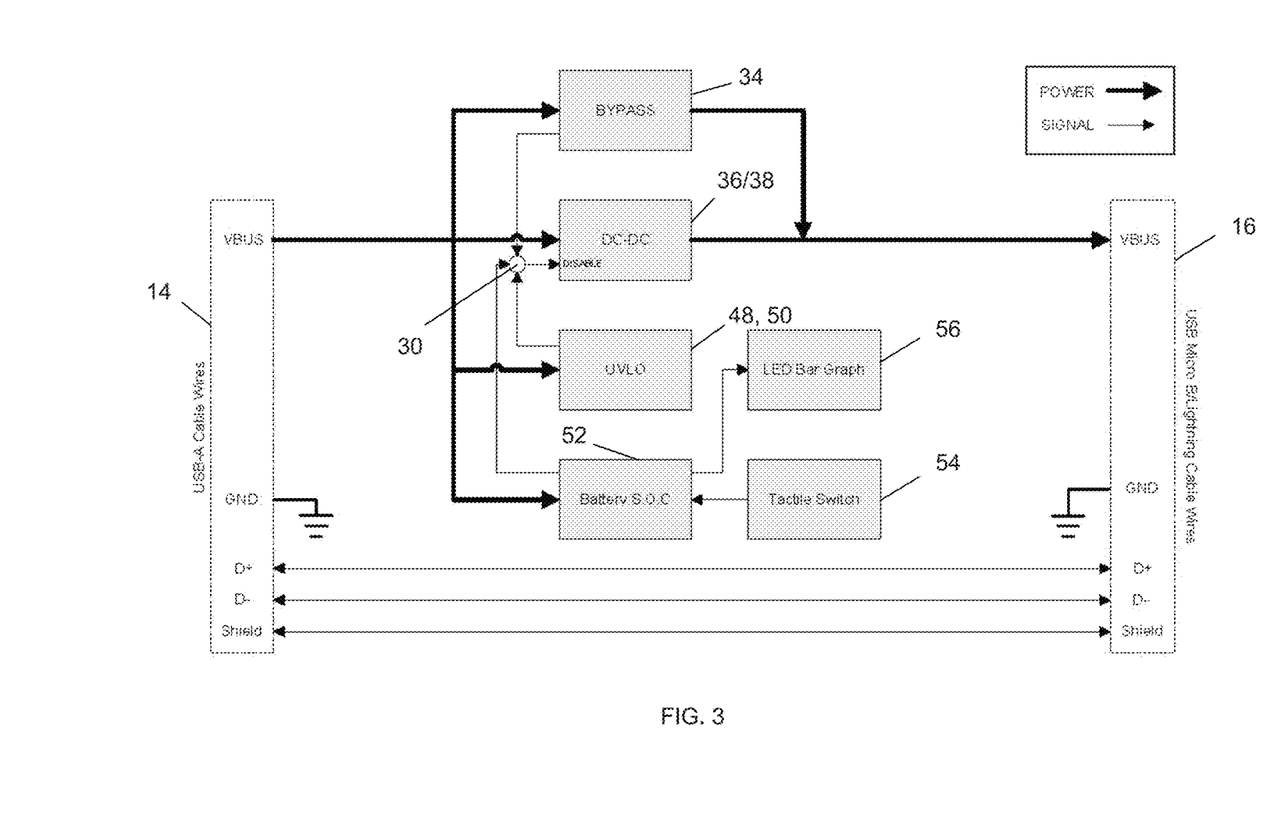
FIG. 3 is a schematic drawing of another charging or analyzing assembly of the inventive smart system or cable.

Referring to FIG. 3, another embodiment of charging assembly 26 is shown. In this embodiment, AC/DC converter is omitted for clarity and simplicity, and the path for power transmission (shown in bold solid lines) and for signal transmission (shown in light dotted lines) are distinguished. This charging assembly 26 also has controller 30 that can disable DC/DC converter 36/38, which in this embodiment is shown as a single unit. Bypass 34 is available to directly charge battery 25 in electronic device 24, when $V_{20}$ is operative to charge battery 25. Preferably, when bypass 34 is the charging circuit path the DC/DC converter is disabled. As discussed above, when $V_{20}$ is DC but is not operative to charge DC/DC converter 36/38 is enabled to step-up or to step-down the DC voltage to charge battery 25.

The embodiment in FIG. 3 also has an UVLO labeled as 50 to turn charging assembly 26 OFF when the charging $V_{20}$ is below a voltage $V_{UVLO}$. This embodiment also shows the state of charge (SOC) 52 of charging battery 20 or battery to be charged 25, or both, as well as the remaining charging time. Preferably, charging assembly 26 further comprises a tactile switch 54 that a user can push to activate SOC 52. A display, such as a LED bar graph 56 is electrically connected to SOC 52 to display the state of charge of source 20 or charging battery 25. Similar to the embodiment illustrated in FIG. 2, this embodiment may also have an energy storage device 48 added to the circuitry, as shown in FIG. 3, which can replace UVLO 50 or be employed in addition to UVLO 50.

It is noted and shown in the claims below that smart system or cable 10 may have energy storage device 48 independent of the other components in charging assembly 26. In other words, a simplified system or cable 10 may store power or energy in energy storage device 48 while power source 20 charges battery 25 or power device 24 without having or utilizing analyzing circuit 28, processor 30 or any of the converters 36, 38 or 42.

Preferably, charging assembly 26 has the capability to limit the input current to below a maximum current. Processor 30 preferably allows the charging at this maximum current and below; however, at charging current below the maximum current the charging time may increase. Preferably, the current limit and the UVLO each has a variable resistor which is programmable by controller 30 to vary the UVLO limit and/or the maximum current limit.

Figure 4:
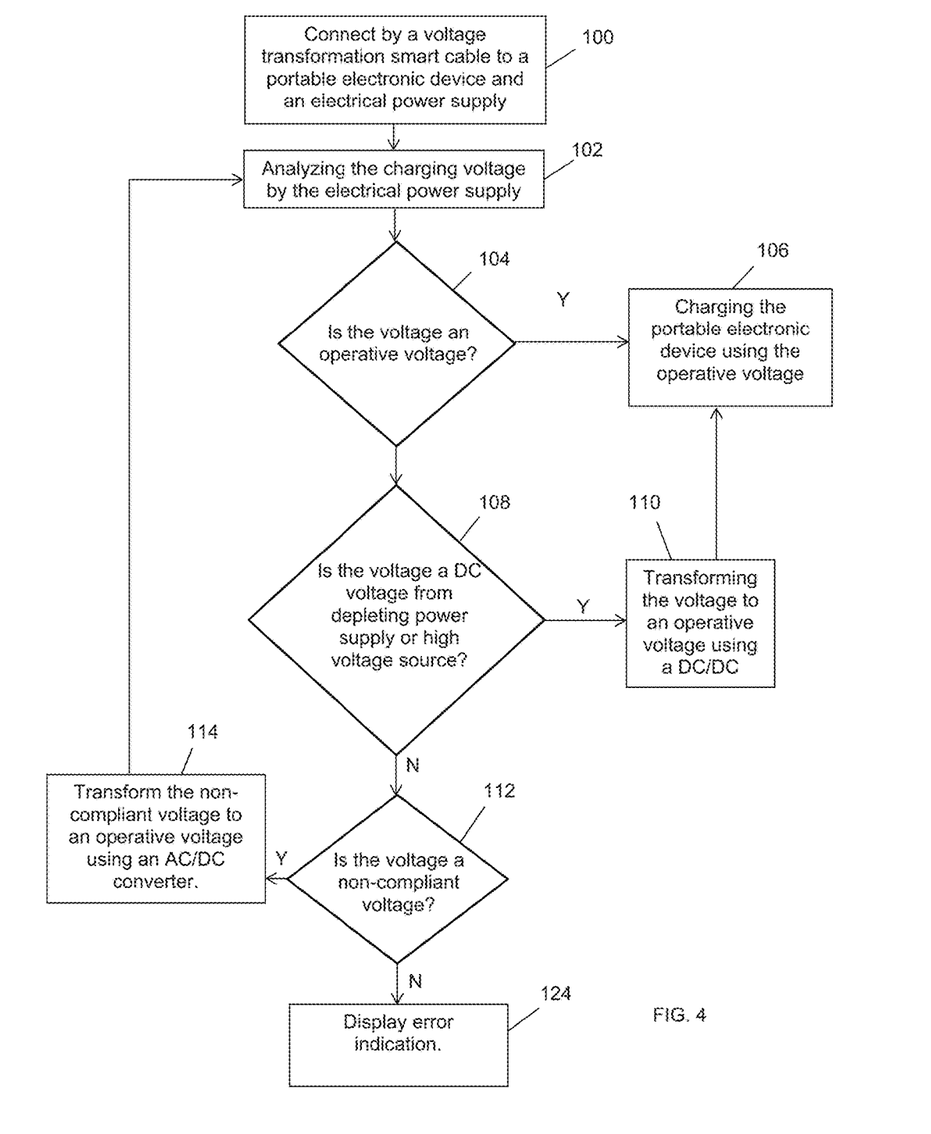
FIG. 4 is a flowchart outlining steps for a method for operating the embodiment shown in FIG. 2.

As shown in FIG. 4, an exemplary operating method for the embodiment of FIG. 2 is illustrated. At step 100, cable 10 is connected to power source 20 and electronic device 24 to charge battery 25. $V_{20}$ is analyzed at step 102. A decision of whether $V_{20}$ is within the operative voltage is made at step 104. If $V_{20}$ is operative, then charging assembly of cable 10 charges battery 25 of electronic device 24 in step 106. If $V_{20}$ is not within the operative range, then a decision whether $V_{20}$ is a DC current is made at step 108. It is noted that step 108 shows that both low DC voltage and high DC voltage can be detected at step 108, step 108 can be divided into two steps, i.e., determining low DC voltage and determining high DC voltage, separately. Low DC voltage and high DC voltage are relative terms determined relative to the operating voltage range.

If $V_{20}$ is a DC current, whether low or high, it is transformed in step 110 into the operative voltage range in step 110. As noted in FIG. 2, separate DC/DC converters 36 and 38 are used and as noted in FIG. 3, a unified DC/DC converter 36/38 is used. After step 110, the transformed DC current $V_{20}$ is used to charge battery 25 or to operate device 24, or both.

If $V_{20}$ is not a DC current, then at step 112 a decision is made whether $V_{20}$ is an AC current. If yes, then at step 114, the AC $V_{20}$ is transformed into DC current and then sent back to step 102 to determine whether the transformed $V_{20}$ can charge immediately or be transformed at step 110 to charge battery 25. Alternatively, the decisions at steps 108 and 112 can be made at one step and the decisions at steps 104, 108 and 112 can be made at the same step. A switch or gate can be used to send $V_{20}$ to step 106, 110 or 114 to continue the process.

Figure 5:
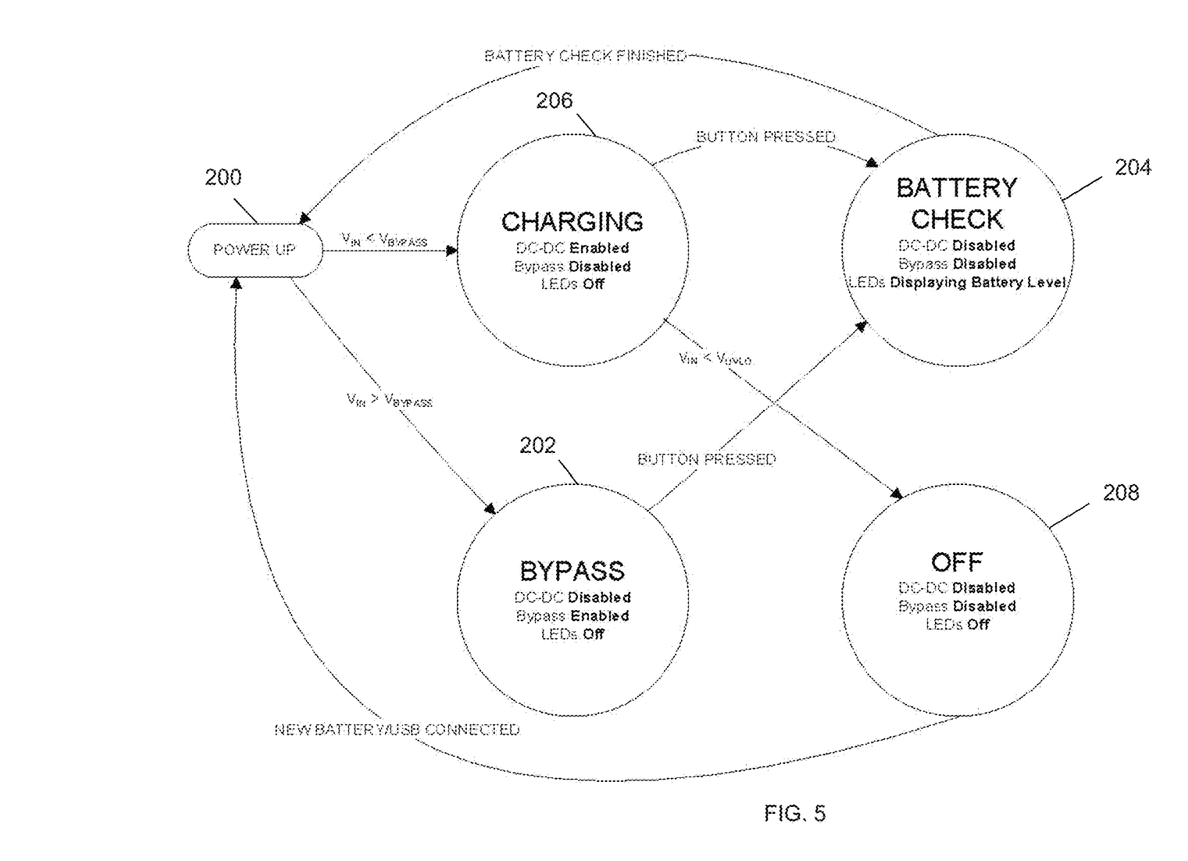
FIG. 5 is a flowchart outlining steps for another method for operating the embodiment shown in FIG. 3.

As shown in FIG. 5, an exemplary operating method for the embodiment of FIG. 3 is illustrated. At the power-up step 200, an analysis of the charging voltage $V_{20}$ is conducted. If $V_{20}$> the bypass voltage, i.e., within the operative voltage, then bypass 34 is activated at step 202 and the charging process begins. When switch, preferably tactile switch, 54 is pressed, a battery check step 204 is conducted. Preferably, both the DC/DC converter 36/38 and bypass 34 are disabled during the battery check. After the battery check is completed, the system may return to the initial power-up step 200 to restart.

If at power-up step 200 $V_{20}$ is less than the bypass voltage, then DC/DC converter 36 is activated while bypass 34 is disabled, as shown as step 206. Here, if switch 54 is pressed battery check step 204 is initiated and afterward the system returns to step 200. If the $V_{20}$ falls below $V_{UVLO}$, charging assembly 26 shuts down at step 208 until a new battery or power source 20 is attached to cable 10. At that time, the system starts up again at power-up step 100.

As mentioned above, power source 20 can be one or more solar power cells. Solar cells can produce DC currents; however, the DC current from the solar cells can vary significantly in voltage and current. Advantageously, DC/DC converters 36 and 38 can be employed alternatively to step the voltage up and down to ensure at the output power at connection end 16 remains substantially constant and compatible with device 24.

Figure 6:
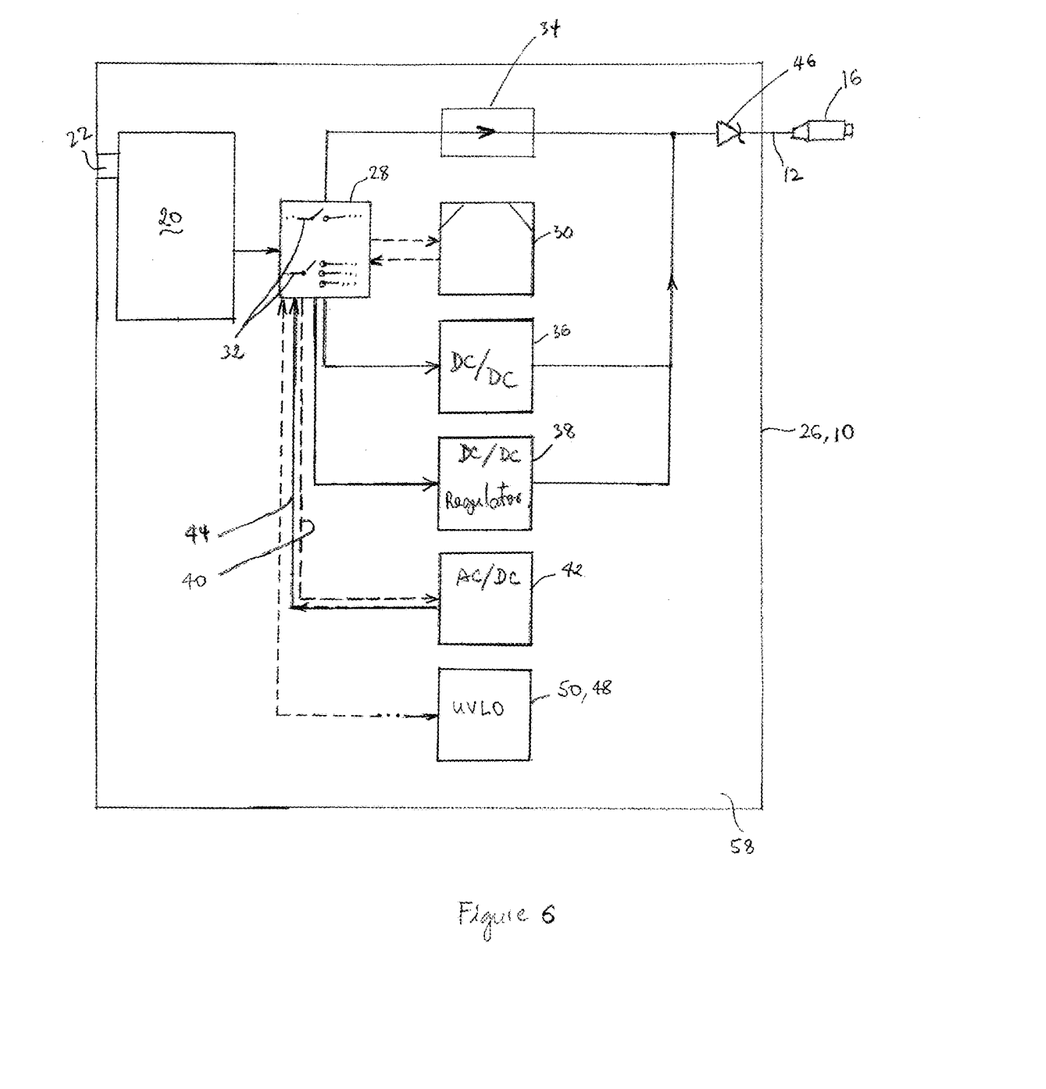
FIG. 6 is a schematic drawing of another embodiment of the inventive smart charging system.

As discussed above, functional element 48 in charging assembly 26 can be a battery or a UVLO component. In one embodiment, charging assembly 26 and charging power source 20 are merged into smart system 10, as best shown in FIG. 6 without cable 12 or with only short section(s) of cable 12. Charging battery or power source 20 is housed within a housing 58 of charging assembly 26 or smart system 10. Housing 58 preferably has a female connector 22 so that charging power source 20 itself can be recharged. A UVLO 50 (or other functional element 48) is preferably included to shut down charging assembly 26 when $V_{20}$ falls below a predetermined level, e.g., below $V_{UVLO}$. An optional short length of cable 12 and a preferred type B USB male connector 16 is provided, as shown. In this embodiment, smart system 10 within housing 58 is a self-sufficient charger for mobile electronic devices that can be plugged into its connector 16. Charging battery or power source 20 can be any of those discussed above.

Figure 7:
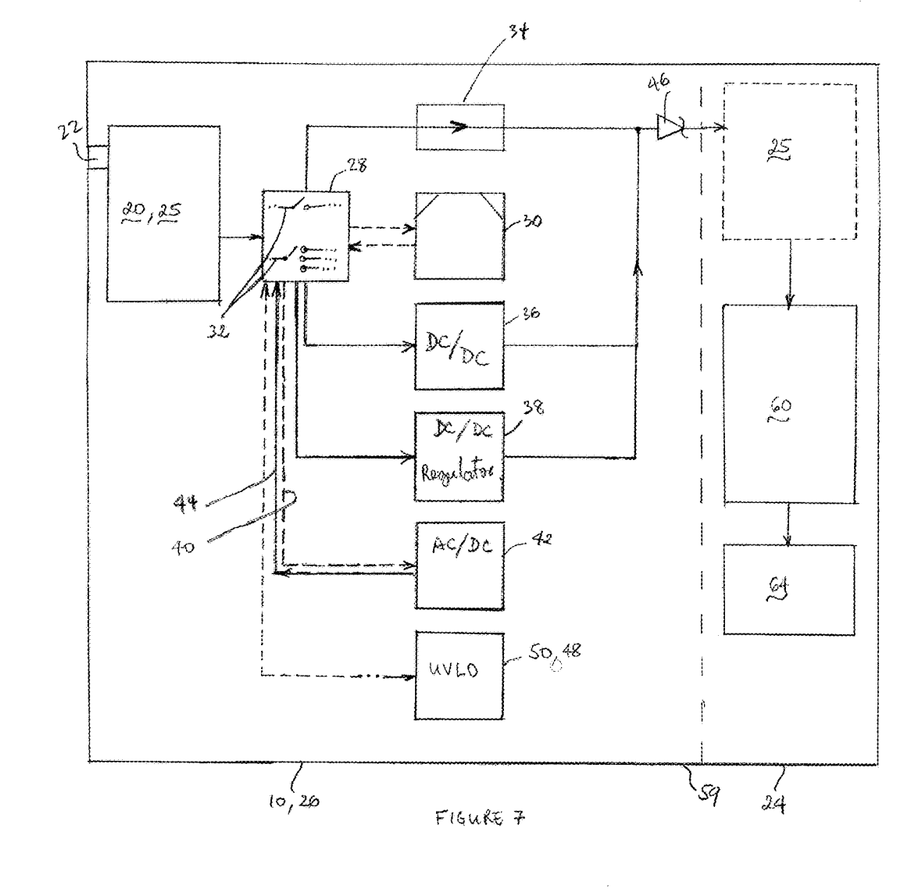
FIG. 7 is a schematic drawing of a combined mobile electronic device and smart charging system.

In another embodiment, the smart charger/system 10 of FIG. 6 is either attached to or incorporated within a same housing 59 as the mobile electronic device 24, as shown in FIG. 7. In this embodiment, battery 25 of device 24 may be replaced by or combined with charging battery 20, as shown. Charging assembly 26 can extract power stored in battery 20, 25 to power electronic device 24, or to charge battery 25 if one is included.

Figure 8A:
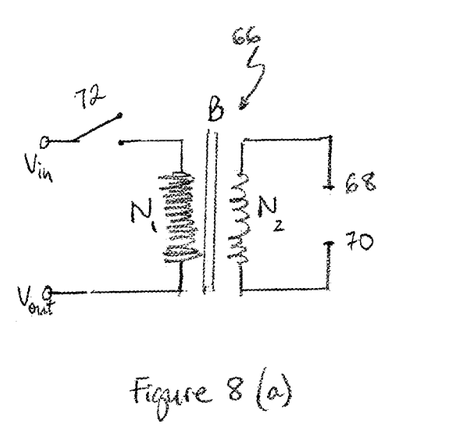
FIG. 8(a) is a schematic drawing of a circuit 60 in an exemplary electronic device that uses the electrical energy from smart system 10 to create a spark.

Electronic device 24 would typically have its own electronics 60 and other functional component 64 that are compatible with the voltage and amperage exiting charging assembly 26 or smart system 10. Certain devices may supplement or boost the exiting voltage and amperage to perform specific function(s). In one example, the electronic device 24 is an electric ignitor or lighter. One type of electronic ignitor is a plasma or arc flameless lighter, such as those disclosed in U.S. published patent application Nos. 2014/0076879 and 2016/0040877 and Chinese patent document CN 203869286 U, which are incorporated herein by reference in their entireties. In this embodiment, electronics 60 would include a transformer 66, as illustrated in FIG. 8(a). Transformer 66 receives the input $V_{in}$, and output $V_{out}$ from either battery 25 or charging assembly 26 (short system 10) and has two opposing windings N1 and N2. Preferably, winding N1 has significantly more windings than winding N2, which is connected to two electrodes 68 and 70, preferably made from ceramic or graphite. When switch 72 is closed, electricity from battery 25 or charging assembly 26 flows through winding N1 and creates a magnetic field B. Magnetic field B induces an electrical potential in winding N2. This electrical potential/current reaches a sufficient level, e.g., 5 to 6 kV, until the electrical arc bridges two electrodes 68 and 70. Such arc ionizes the air between the electrodes and create a flameless spark at temperatures between about 800° C. to about 1200° C., and typically around 1000° C. to 1100° C., sufficient to ignite organic materials, such as dried leaves, small branches or other kindling for camping.

Figure 9A:
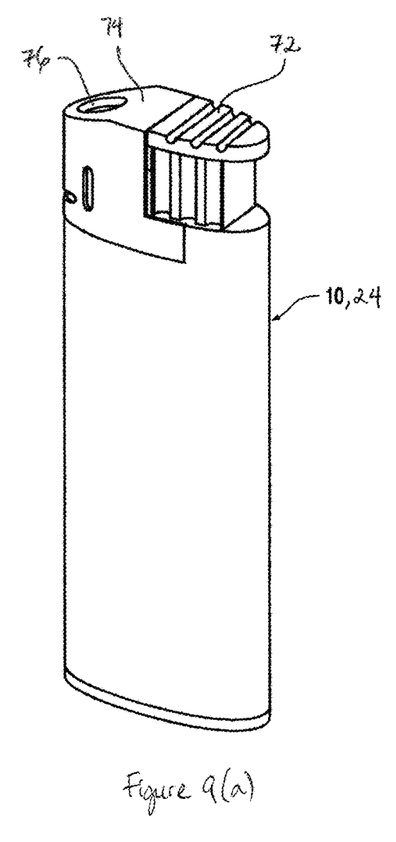
FIG. 9(a) is a perspective view of an exemplary electronic device according to the present invention.
Figure 9B:
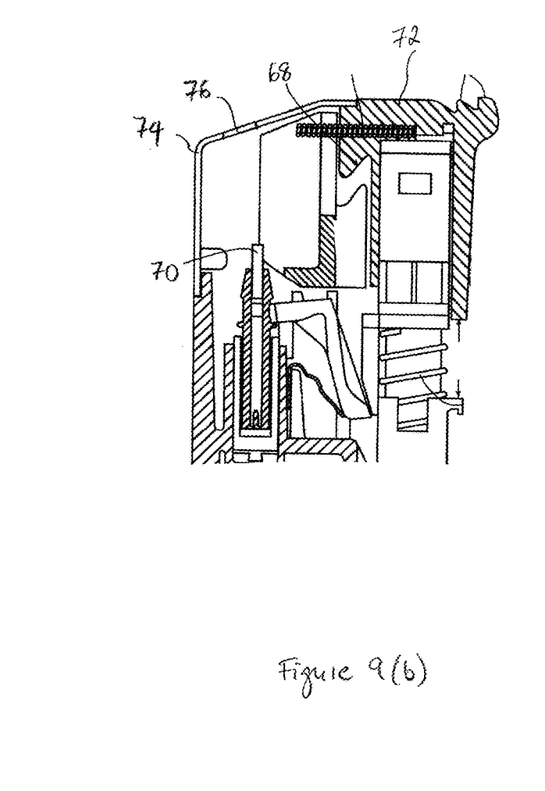
FIG. 9(b) is a partial cross-sectional view of the upper end of the exemplary electronic device of FIG. 9(a).

An exemplary electrical ignitor or lighter is illustrated in FIGS. 9(a) and 9(b), which resembles a piezoelectric lighter, with switch 72 being a pushbutton and electrodes 68 and 70 being optionally shrouded by shield 74, which preferably is made from a heat insulation material, such as ceramic. An opening 76 is defined in shield 74 to allow access to the electrical arc between electrodes 68 and 70. Preferably, a significant force, e.g., greater than 3N (kg-weight), preferably more than 5N (kg-weight) to discourage unintended used. Alternatively, shield 74 can be pivotally and reversible moved away from the electrodes allowing access to the arc.

Figure 8B:
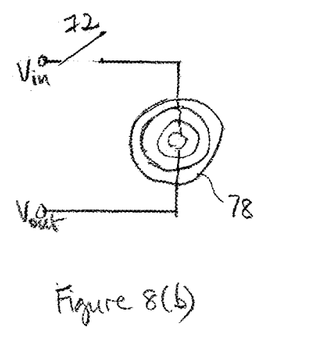
FIGS. 8(b) and 8(c) are schematic drawings of another circuit 60 that uses the electrical energy from smart system 10 to generate heat.
Figure 8C:
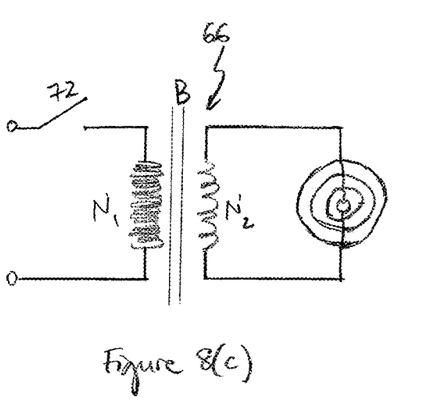

Other electric ignitors or lighters include those that utilize a resistant heating element that heats up when an electrical current passes therethrough, similar to conventional automobile lighters normally disposed on the automobile dashboard or to electrical heating elements on household stoves. Such heating elements are made from a Nickel and Chromium alloy also known as Nichrome, and are known in the art. As shown in FIG. 8(b), heating element 78 is connected to the input and output of charging assembly 26 or battery 25. Alternatively, transformer 66 is included to boost the electrical current through heating element 78. Preferably, heating element 78 is protected by a shield similar to heat insulative ceramic shield 74 shown in FIGS. 9(a) and 9(b), with opening 76 provided for access to heating element 78. Temperature of the heating element 78 can reach about 800° C. to about 1200° C., and typically around 1000° C. to 1100° C., which is sufficient to ignite organic materials, such as dried leaves, small branches or other kindling for camping. The same switch 72, which requires a significant force to push, can also be used. Lighters with such heating element are disclosed in U.S. published patent application Nos. 2012/0193343 and 2007/0045276 and in U.S. Pat. Nos. 2,959,664, 5,235,157 and 7,586,063, which are incorporated herein by reference in their entireties.

While various embodiments of the present invention have been described above, it should be understood that they have been presented by way of illustration and example only, and not limitation. It is specifically noted that component(s) from one embodiment can be incorporated into other embodiment(s). It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

We claim:
1. An electronic system comprising:
 an analyzing assembly electrically connected to an energy storage device disposed within a housing of the electronic system, wherein the analyzing assembly includes:
 a voltage analyzing circuit to analyze a first voltage supplied by the energy storage device;

at least one electrical converter to transform the first voltage to a second voltage sufficient to charge a battery of an electronic device or to power the electronic device, a bypass circuit; and an under voltage lock out device;

wherein when the first voltage is sufficient to charge the battery or to power the electronic device the first voltage is directed to the bypass circuit to charge the battery or to power the electronic device, wherein when the first voltage is not sufficient to charge the battery or to power the electronic device the first voltage is transformed to the second voltage by the at least one electrical converter to charge the battery or to power the electronic device, and wherein the under voltage lock out device shuts down the electronic device when the first voltage falls below operating voltage of the electronic device, or shuts down the electronic system when the first voltage falls below a predetermined level.

2. The electronic system of claim 1, wherein the at least one electrical converter comprises a DC/DC converter.

3. The electronic system of claim 2, wherein the DC/DC converter is a step-up converter.

4. The electronic system of claim 2, wherein the DC/DC converter is a step-down converter.

5. The electronic system of claim 1, wherein the at least one electrical converter comprises an AC/DC converter.

6. The electronic system of claim 1 further comprises a state of charge indicator.

7. The electronic system of claim 6 further comprises an operating switch connected to the state of charge indicator.

8. The electronic system of claim 1, wherein the energy storage device comprises mother battery or a capacitor.

9. The electronic system of claim 1, wherein the electronic device is contained in the housing.

10. The electronic system of claim 1, wherein the electronic device comprises a lighter.

11. The electronic system of claim 10, wherein the lighter comprises an arc lighter.

12. The electronic system of claim 10, wherein the lighter comprises a heating element.

13. An electronic device comprising:

an analyzing assembly electrically connected to an energy storage device, wherein the analyzing assembly includes:

a voltage analyzing circuit to analyze a first voltage supplied by the energy storage device;

at least one electrical converter to transform the first voltage to a second voltage sufficient to power the electronic device;

a bypass circuit; and an under voltage lock out device;

wherein when the first voltage is sufficient to power the electronic device the first voltage is directed to the bypass circuit to power the electronic device, wherein when the first voltage is not sufficient to power the electronic device the first voltage is transformed to the second voltage by the at least one electrical converter to power the electronic device, and wherein the under voltage lock out device shuts down the electronic device when the first voltage falls below operating voltage of the electronic device, or shuts down the electronic device when the first voltage falls below a predetermined level.

14. The electronic system of claim 13, wherein the at least one electrical converter comprises a DC/DC converter.

15. The electronic system of claim 14, wherein the DC/DC converter is a step-up converter.

16. The electronic system of claim 14, wherein the DC/DC converter is a step-down converter.

17. The electronic system of claim 13, wherein the at least one electrical converter comprises an AC/DC converter.

18. The electronic system of claim 13, wherein the electronic device comprises a lighter.

19. The electronic system of claim 18, wherein the lighter comprises an arc lighter.

20. The electronic system of claim 18, wherein the lighter comprises a heating element.

* * * * *